United States Patent
Nara et al.

(10) Patent No.: US 10,348,592 B2
(45) Date of Patent: Jul. 9, 2019

(54) SYSTEMS AND METHODS FOR DYNAMIC AVAILABILITY OF EXECUTABLE ENDPOINTS

(71) Applicant: Dell Products L.P., Round Rock, TX (US)

(72) Inventors: Prakash Nara, Round Rock, TX (US); Sudhir Vittal Shetty, Cedar Park, TX (US)

(73) Assignee: Dell Products L.P., Round Rock, TX (US)

( * ) Notice: Subject to any disclaimer, the term of this patent is extended or adjusted under 35 U.S.C. 154(b) by 354 days.

(21) Appl. No.: 15/427,343

(22) Filed: Feb. 8, 2017

(65) Prior Publication Data
US 2018/0227200 A1    Aug. 9, 2018

(51) Int. Cl.
*H04L 12/26* (2006.01)

(52) U.S. Cl.
CPC .......... *H04L 43/0817* (2013.01); *H04L 43/16* (2013.01)

(58) Field of Classification Search
CPC ................. H04L 43/0817; H04L 43/16
USPC ......................................... 709/224
See application file for complete search history.

(56) References Cited

U.S. PATENT DOCUMENTS

| | | | |
|---|---|---|---|
| 9,607,020 B1 * | 3/2017 | Bosco | G06F 16/27 |
| 2003/0078954 A1 * | 4/2003 | Haughey | G06F 9/4881 718/102 |
| 2012/0143938 A1 * | 6/2012 | du Preez | G06F 8/65 709/201 |
| 2013/0185735 A1 * | 7/2013 | Farrell | G06F 9/542 719/318 |
| 2017/0131998 A1 * | 5/2017 | Bucknell | G06F 8/71 |

* cited by examiner

*Primary Examiner* — Wing F Chan
*Assistant Examiner* — Leon Y Tseng
(74) *Attorney, Agent, or Firm* — Jackson Walker L.L.P.

(57) ABSTRACT

In accordance with embodiments of the present disclosure, a method may include, in response to an attempted execution of an executable endpoint, determining if the executable endpoint is unexpired, performing an endpoint operation of the executable endpoint if the endpoint is unexpired, after performance of the endpoint operation, determining if the executable endpoint has met a condition for expiration, and modifying metadata associated with the executable endpoint such that the executable endpoint is prevented from further attempted execution if the executable endpoint has met a condition for expiration.

21 Claims, 2 Drawing Sheets

SYSTEMS AND METHODS FOR DYNAMIC AVAILABILITY OF EXECUTABLE ENDPOINTS

TECHNICAL FIELD

The present disclosure relates in general to information handling systems, and more particularly to controlling availability of certain executable endpoints used in factory provisioning of a chassis configured to receive a plurality of information handling systems.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

In manufacture of a chassis for housing multiple information handling systems, the chassis may go through multiple factory build processes. For example, factory build processes may include provisioning of data, programming of default configurations, testing, and other processes. Some factory processes use user-available chassis software tools and application programming interfaces (APIs) and some other factory processes use hidden or undocumented chassis software tools/API, which are not intended for use by a user. However, using traditional approaches, there is no well-defined method or technique to restrict the chassis software tools/API to factory processes only, as these tools/API are part of the chassis product, and may be potentially executed by a customer. For example, obscurity by means of providing no documentation to the user is a method used now to restrict the execution of these chassis tools/API by a user.

SUMMARY

In accordance with the teachings of the present disclosure, certain disadvantages and problems associated with controlling access and availability to certain executable endpoints have been reduced or eliminated.

In accordance with embodiments of the present disclosure, a method may include, in response to an attempted execution of an executable endpoint, determining if the executable endpoint is unexpired, performing an endpoint operation of the executable endpoint if the endpoint is unexpired, after performance of the endpoint operation, determining if the executable endpoint has met a condition for expiration, and modifying metadata associated with the executable endpoint such that the executable endpoint is prevented from further attempted execution if the executable endpoint has met a condition for expiration.

In accordance with these and other embodiments of the present disclosure, an article of manufacture may include a non-transitory computer readable medium and computer-executable instructions carried on the computer readable medium, the instructions readable by a processor, the instructions, when read and executed, for causing the processor to, in response to an attempted execution of an executable endpoint: determine if the executable endpoint is unexpired, perform an endpoint operation of the executable endpoint if the endpoint is unexpired, after performance of the endpoint operation, determine if the executable endpoint has met a condition for expiration, and modify metadata associated with the executable endpoint such that the executable endpoint is prevented from further attempted execution if the executable endpoint has met a condition for expiration.

In accordance with these and other embodiments of the present disclosure, an information handling system may include a processor and a program of executable instructions embodied in computer readable media, and configured to, when read and executed by the processor, in response to an attempted execution of an executable endpoint: determine if the executable endpoint is unexpired, perform an endpoint operation of the executable endpoint if the endpoint is unexpired, after performance of the endpoint operation, determine if the executable endpoint has met a condition for expiration, and modify metadata associated with the executable endpoint such that the executable endpoint is prevented from further attempted execution if the executable endpoint has met a condition for expiration.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
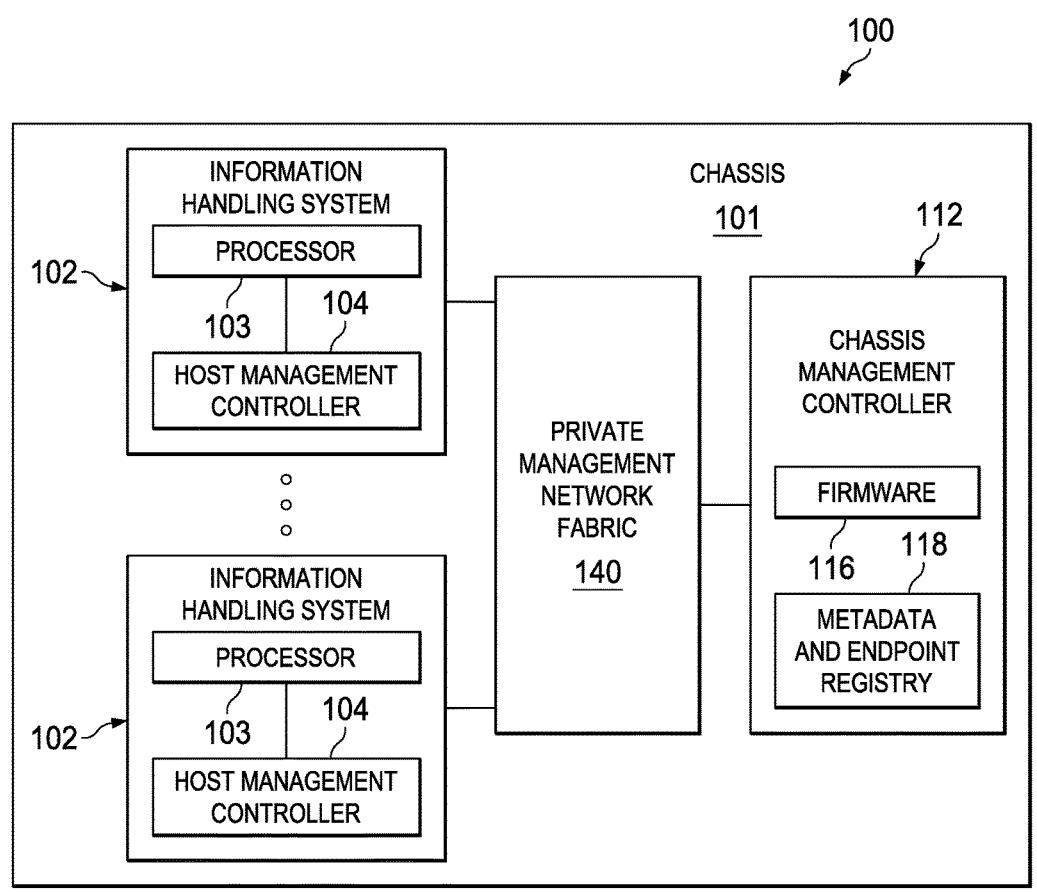
FIG. 1 illustrates a block diagram of an example system chassis with multiple modular information handling systems disposed therein, in accordance with embodiments of the present disclosure.
Figure 2:
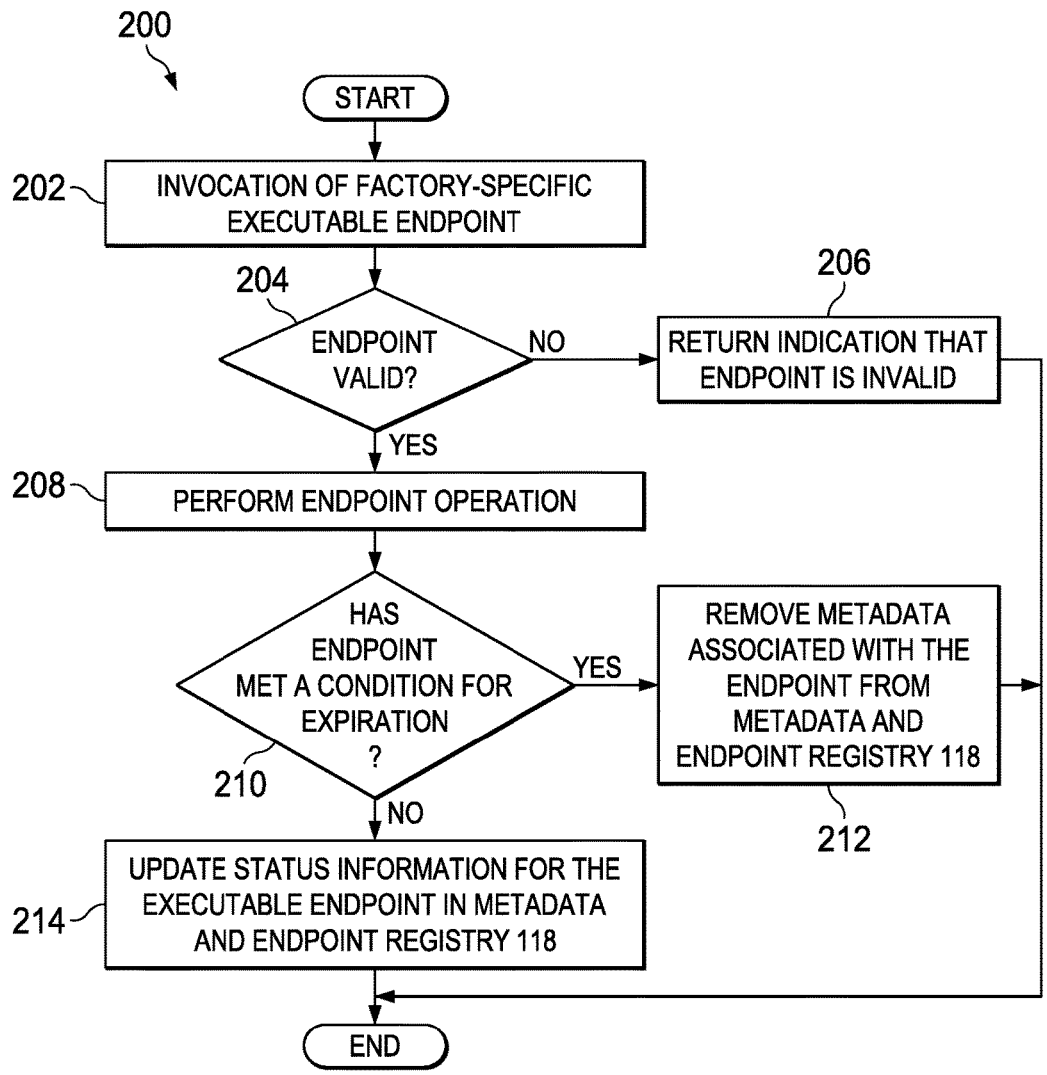
FIG. 2 illustrates a flow chart of an example method for controlling availability of executable endpoints, in accordance with embodiments of the present disclosure.

Preferred embodiments and their advantages are best understood by reference to FIGS. 1 and 2, wherein like numbers are used to indicate like and corresponding parts.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU") or hardware or software control logic. Additional components of the information handling system may include one or more storage devices, one or more communications ports for communicating with external devices as well as various I/O devices, such as a keyboard, a mouse, and a video display. The information handling system may also include one or more busses operable to transmit communication between the various hardware components.

For the purposes of this disclosure, information handling resources may broadly refer to any component system, device or apparatus of an information handling system, including without limitation processors, buses, memories, I/O devices and/or interfaces, storage resources, network interfaces, motherboards, electro-mechanical devices (e.g., fans), displays, and power supplies.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory ("RAM"), read-only memory ("ROM"), electrically erasable programmable read-only memory ("EEPROM"), and/or flash memory; as well as communications media such as wires, optical fibers, microwaves, radio waves, and other electromagnetic and/or optical carriers; and/or any combination of the foregoing.

FIG. 1 illustrates a block diagram of an example system 100 comprising a chassis 101 with multiple modular information handling systems 102 disposed therein, in accordance with embodiments of the present disclosure. As depicted in FIG. 1, system 100 may comprise a chassis 101 including a plurality of information handling systems 102, a private management network fabric 140, and a chassis management controller 112. In addition to information handling systems 102, private management network fabric 140, and chassis management controller 112, chassis 101 may include one or more other information handling resources.

An information handling system 102 may generally be operable to receive data from and/or communicate data to one or more information handling resources of chassis 101, including communicating with chassis management controller 112 via private management network fabric 140. In certain embodiments, an information handling system 102 may be a server. In such embodiments, an information handling system may comprise a blade server having modular physical design. In these and other embodiments, an information handling system 102 may comprise an M class server. As depicted in FIG. 1, an information handling system 102 may include a processor 103 and a host management controller 104. In addition to processor 103 and host management controller 104, information handling system 102 may include one or more other information handling resources.

A processor 103 may include any system, device, or apparatus configured to interpret and/or execute program instructions and/or process data, and may include, without limitation, a microprocessor, microcontroller, digital signal processor ("DSP"), application specific integrated circuit ("ASIC"), or any other digital or analog circuitry configured to interpret and/or execute program instructions and/or process data. In some embodiments, processor 103 may interpret and/or execute program instructions and/or process data stored in a memory or other computer-readable media accessible to processor 103.

Information handling system 102 may include a host management controller 104. Host management controller 104 may be implemented by, for example, a microprocessor, microcontroller, DSP, ASIC, EEPROM, or any combination thereof. Host management controller 104 may be configured to communicate with chassis management controller 112. Such communication may be made, for example, via private management network fabric 140. Host management controller 104 may be configured to provide out-of-band management facilities for management of information handling system 102. Such management may be made by information handling resources of chassis 101 even if information handling system 102 is powered off or powered to a standby state. Host management controller 104 may include a processor, memory, and network connection separate from the rest of information handling system 102. In certain embodiments, host management controller 104 may include or may be an integral part of a baseboard management controller (BMC), Dell Remote Access Controller (DRAC) or an Integrated Dell Remote Access Controller (iDRAC).

Chassis management controller 112 may comprise any system, device, or apparatus configured to facilitate management and/or control of system 100 embodied by chassis 101, its information handling systems 102, and/or one or more of its component information handling resources. Chassis management controller 112 may be configured to issue commands and/or other signals to manage and/or control an information handling system 102 and/or information handling resources of system 100. Chassis management controller 112 may comprise a microprocessor, microcontroller, DSP, ASIC, field programmable gate array ("FPGA"), EEPROM, or any combination thereof. In some embodiments, chassis management controller 112 may provide a management console for user/administrator access to these functions. For example, chassis management controller 112 may implement Web Services Management ("WS-MAN") or another suitable management protocol permitting a user to remotely access chassis management controller 112 to configure system 100 and its various information handling resources. In such embodiments, chassis management controller 112 may interface with a network interface, thus allowing for "out-of-band" control of system 100, such that communications to and from chassis management controller 112 are communicated via a management channel physically isolated from an "in-band" communication channel of chassis 101 for which non-management communication may take place. Thus, for example, if a failure occurs in system 100 that prevents an administrator from interfacing with system 100 via the in-band communication channel or a user interface associated with chassis 101 (e.g., power failure, etc.), the administrator may still be able to monitor and/or manage system 100 (e.g., to diagnose problems that may have caused failure) via chassis management controller 112.

In the same or alternative embodiments, chassis management controller 112 may allow an administrator to remotely manage one or more parameters associated with operation of system 100 and its various information handling resources (e.g., power usage, processor allocation, memory allocation, security privileges, etc.). In some embodiments, chassis management controller 112 may include a management services module.

As shown in FIG. 1, chassis management controller 112 may include firmware 116 and metadata and endpoint registry 118. Firmware 116 may comprise a program of executable instructions configured to, when executed by a processor (e.g., a processor internal to chassis management controller 112), carry out the functionality of chassis management controller 112.

Metadata and endpoint registry 118 may include a database, list, table, map, or other suitable data structure configured to set forth metadata defining policies for executable endpoints and a registry of the executable endpoints defining status information for the executable endpoints. For example, policies may define conditions upon which an executable endpoint may expire. For example, a policy may define that an executable endpoint may expire after a configurable number of invocations of the endpoint. As another example, a policy may define that an executable endpoint may expire after a configurable number of boots of chassis management controller 112 or an information handling system 102. As a further example, a policy may define that an executable endpoint may expire after an invocation of another endpoint. As yet another example, a policy may define that an executable endpoint may expire after an expiration of a period of time.

Status information for an executable endpoint may include whether an endpoint is expired or unexpired and other parameters that may be useful in determining whether the executable endpoint is expired (e.g., the number of invocations of the executable endpoint, so as to expire the endpoint when it has reached a number of invocations as defined by a policy).

As used herein, the term "executable endpoint" may mean any module, thread, program, or executable process that may be executed during a factory build process of a chassis or its component parts. In a particular embodiment, an executable endpoint may comprise a Representational State Transfer (REST) Protocol endpoint.

Private management network fabric 140 may comprise a network and/or fabric configured to couple information handling systems 102 (e.g., via host management controller 104) and chassis management controller 112 to each other and/or one or more other information handling resources of chassis 101. In these and other embodiments, private management network fabric 140 may include a communication infrastructure, which provides physical connections, and a management layer, which organizes the physical connections and information handling resources communicatively coupled to private management network fabric 140. Private management network fabric 140 may be implemented as, or may be a part of, an Ethernet local area network (LAN) or any other appropriate architecture or system that facilitates the communication of signals, data, and/or messages.

FIG. 2 illustrates a flow chart of an example method 200 for controlling availability of executable endpoints, in accordance with embodiments of the present disclosure. According to some embodiments, method 200 may begin at step 202. As noted above, teachings of the present disclosure may be implemented in a variety of configurations of system 100. As such, the preferred initialization point for method 200 and the order of the steps comprising method 200 may depend on the implementation chosen.

At step 202, an attempt may be made (e.g., by a factory build process or by a user) to invoke a factory-specific executable endpoint. At step 204, the endpoint itself, firmware 116, or another executable program, may reference metadata and endpoint registry 118 to determine if the endpoint is valid (e.g., unexpired). For example, an endpoint may be determined to be valid only if an entry appears for the endpoint in metadata and endpoint registry 118. If the endpoint is expired, method 200 may proceed to step 206. Otherwise, if the endpoint is unexpired, method 200 may proceed to step 208.

At step 206, responsive to the endpoint being expired, the endpoint itself, firmware 116, or another executable program, may return an indication (e.g., error message) that the endpoint is invalid. After completion of step 206, method 200 may end.

At step 208, responsive to the endpoint being unexpired, the endpoint itself, firmware 116, or another executable program, may perform the endpoint operation. At step 210, after completion of the endpoint operation, the endpoint itself, firmware 116, or another executable program may reference metadata and endpoint registry 118 to determine if the endpoint has met a condition for expiration. If the endpoint has met a condition for expiration, method 200 may proceed to step 212. Otherwise, if the endpoint has not met a condition for expiration, method 200 may proceed to step 214.

At step 212, responsive to the endpoint meeting a condition for expiration, the endpoint itself, firmware 116, or another executable program may remove metadata associated with the endpoint from metadata and endpoint registry 118, such that any further attempt to execute the endpoint will result in the endpoint being determined to be invalid or expired. After completion of step 212, method 200 may end.

At step 214, responsive to the endpoint not meeting a condition for expiration, the endpoint itself, firmware 116, or another executable program may, as appropriate, update status information for the executable endpoint (e.g., updating the number of successful invocations of the endpoint) in metadata and endpoint registry 118. After completion of step 214, method 200 may end.

Although FIG. 2 discloses a particular number of steps to be taken with respect to method 200, method 200 may be executed with greater or lesser steps than those depicted in FIG. 2. In addition, although FIG. 2 discloses a certain order of steps to be taken with respect to method 200, the steps comprising method 200 may be completed in any suitable order.

Method 200 may be implemented using system 100, and/or any other system operable to implement method 200. In certain embodiments, method 200 may be implemented partially or fully in software and/or firmware embodied in computer-readable media.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

What is claimed is:

1. A method comprising:
   in response to an attempted execution of an executable endpoint:
   determining if the executable endpoint is unexpired;
   performing an endpoint operation of the executable endpoint if the endpoint is unexpired;
   after performance of the endpoint operation, determining if the executable endpoint has met a condition for expiration; and
   modifying metadata associated with the executable endpoint such that the executable endpoint is prevented from further attempted execution if the executable endpoint has met a condition for expiration.

2. The method of claim 1, wherein determining if the executable endpoint is unexpired and determining if the executable endpoint has met a condition for expiration comprises referencing a metadata and endpoint registry.

3. The method of claim 2, wherein modifying metadata associated with the executable endpoint comprises modifying the metadata and endpoint registry.

4. The method of claim 3, wherein modifying the metadata and endpoint registry comprises deleting metadata and information associated with the executable endpoint from the metadata and endpoint registry.

5. The method of claim 1, further comprising modifying metadata associated with the executable endpoint to update status information associated with the executable endpoint if the executable endpoint has not met a condition for expiration.

6. The method of claim 5, wherein the status information comprises a parameter indicative of the number of times the executable endpoint has been invoked.

7. The method of claim 1, wherein the condition for expiration includes one of: a number of invocations of the executable endpoint reaching a first threshold; a number of boots of an information handling system or information handling resource reaching a second threshold; an invocation of another executable endpoint other than the executable endpoint; and an expiration of a period of time.

8. An article of manufacture comprising:
   a non-transitory computer readable medium; and
   computer-executable instructions carried on the computer readable medium, the instructions readable by a processor, the instructions, when read and executed, for causing the processor to, in response to an attempted execution of an executable endpoint:
   determine if the executable endpoint is unexpired;
   perform an endpoint operation of the executable endpoint if the endpoint is unexpired;
   after performance of the endpoint operation, determine if the executable endpoint has met a condition for expiration; and
   modify metadata associated with the executable endpoint such that the executable endpoint is prevented from further attempted execution if the executable endpoint has met a condition for expiration.

9. The article of claim 8, wherein determining if the executable endpoint is unexpired and determining if the executable endpoint has met a condition for expiration comprises referencing a metadata and endpoint registry.

10. The article of claim 9, wherein modifying metadata associated with the executable endpoint comprises modifying the metadata and endpoint registry.

11. The article of claim 10, wherein modifying the metadata and endpoint registry comprises deleting metadata and information associated with the executable endpoint from the metadata and endpoint registry.

12. The article of claim 8, further comprising modifying metadata associated with the executable endpoint to update status information associated with the executable endpoint if the executable endpoint has not met a condition for expiration.

13. The article of claim 12, wherein the status information comprises a parameter indicative of the number of times the executable endpoint has been invoked.

14. The article of claim 8, wherein the condition for expiration includes one of: a number of invocations of the executable endpoint reaching a first threshold; a number of boots of an information handling system or information handling resource reaching a second threshold; an invocation of another executable endpoint other than the executable endpoint; and an expiration of a period of time.

15. An information handling system comprising:
    a processor; and
    a program of executable instructions embodied in computer readable media, and configured to, when read and executed by the processor, in response to an attempted execution of an executable endpoint:
    determine if the executable endpoint is unexpired;
    perform an endpoint operation of the executable endpoint if the endpoint is unexpired;
    after performance of the endpoint operation, determine if the executable endpoint has met a condition for expiration; and
    modify metadata associated with the executable endpoint such that the executable endpoint is prevented from further attempted execution if the executable endpoint has met a condition for expiration.

16. The information handling system of claim 15, wherein determining if the executable endpoint is unexpired and determining if the executable endpoint has met a condition for expiration comprises referencing a metadata and endpoint registry.

17. The information handling system of claim 16, wherein modifying metadata associated with the executable endpoint comprises modifying the metadata and endpoint registry.

18. The information handling system of claim 17, wherein modifying the metadata and endpoint registry comprises deleting metadata and information associated with the executable endpoint from the metadata and endpoint registry.

19. The information handling system of claim 15, further comprising modifying metadata associated with the executable endpoint to update status information associated with the executable endpoint if the executable endpoint has not met a condition for expiration.

20. The information handling system of claim 19, wherein the status information comprises a parameter indicative of the number of times the executable endpoint has been invoked.

21. The information handling system of claim 15, wherein the condition for expiration includes one of: a number of invocations of the executable endpoint reaching a first threshold; a number of boots of an information handling system or information handling resource reaching a second threshold; an invocation of another executable endpoint other than the executable endpoint; and an expiration of a period of time.

* * * * *